(12) United States Patent
Johnson et al.

(10) Patent No.: US 7,748,046 B2
(45) Date of Patent: Jun. 29, 2010

(54) SECURITY CLAIM TRANSFORMATION WITH INTERMEDIATE CLAIMS

(75) Inventors: Ryan D. Johnson, Bothell, WA (US); Donald E. Schmidt, Redmond, WA (US); Jeffrey F. Spelman, Woodinville, WA (US); Kahren Tevosyan, Kirkland, WA (US); Vijayavani Nori, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1224 days.

(21) Appl. No.: 11/119,236

(22) Filed: Apr. 29, 2005

(65) Prior Publication Data

US 2006/0248598 A1 Nov. 2, 2006

(51) Int. Cl.
*G06F 21/00* (2006.01)

(52) U.S. Cl. ............... 726/27; 726/1; 726/2; 726/6; 726/18; 726/19; 726/20; 713/168; 713/170; 713/172; 713/175; 713/185; 380/229

(58) Field of Classification Search ............... 726/6, 726/18–20, 1, 2, 27; 713/168, 170, 172, 713/175, 185; 705/66, 67; 707/1–3
See application file for complete search history.

(56) References Cited

U.S. PATENT DOCUMENTS

| | | | | |
|---|---|---|---|---|
| 4,918,646 | A | * | 4/1990 | Hirose ............................ 707/3 |
| 6,026,392 | A | * | 2/2000 | Kouchi et al. ................... 707/2 |
| 6,144,959 | A | | 11/2000 | Anderson et al. |
| 6,263,342 | B1 | * | 7/2001 | Chang et al. ............ 707/103 R |
| 6,535,874 | B2 | * | 3/2003 | Purcell ........................... 707/3 |
| 6,651,055 | B1 | * | 11/2003 | Kilmer et al. .................. 707/3 |

(Continued)

FOREIGN PATENT DOCUMENTS

EP 1445916 11/2004

(Continued)

OTHER PUBLICATIONS

Kuznetsov, E.,"Federated Identity Management and Web Services", Jan. 13, 2005, http://www.news.zdnet.com/2100-100922-140727. html. pp. 1-5.*

(Continued)

*Primary Examiner*—Kambiz Zand
*Assistant Examiner*—Tongoc Tran

(57) ABSTRACT

Systems and methods directed at transforming security claims in a federated authentication system using an intermediate format. The systems and methods described herein are directed at transforming security claims in a federated authentication system using an intermediate format. The federated authentication system includes an identity provider and a resource provider. The identity provider receives a request for information from the resource provider to authenticate an account by an application associated with the resource provider. A security claim associated with the account is retrieved where the security claim is provided by an account store in a format specific to the account store. The security claim is transformed from the account store specific format to an intermediate format. The security claim is then transformed from the intermediate format to a federated format recognized by the resource provider. The transformed security claim is provided in a security token to the resource provider. A similar two step transformation process using intermediate claims can also be implemented by the resource provider to transform security claims provided by an identity provider from a federated format to formats recognized by the applications.

18 Claims, 8 Drawing Sheets

U.S. PATENT DOCUMENTS

| | | | |
|---|---|---|---|
| 6,668,322 B1 | 12/2003 | Wood et al. | |
| 6,941,291 B1* | 9/2005 | Zoller et al. | 707/1 |
| 7,152,067 B2* | 12/2006 | Yagawa et al. | 707/10 |
| 7,194,547 B2* | 3/2007 | Moreh et al. | 709/229 |
| 7,240,045 B1* | 7/2007 | Bushee | 707/3 |
| 7,346,923 B2* | 3/2008 | Atkins et al. | 726/6 |
| 7,363,287 B2* | 4/2008 | Kilmer et al. | 707/2 |
| 2001/0002470 A1* | 5/2001 | Inohara et al. | 707/1 |
| 2003/0041240 A1* | 2/2003 | Roskind et al. | 713/168 |
| 2003/0126441 A1* | 7/2003 | Laux et al. | 713/168 |
| 2003/0163737 A1* | 8/2003 | Roskind | 713/201 |
| 2003/0212673 A1* | 11/2003 | Kadayam et al. | 707/3 |
| 2004/0103324 A1 | 5/2004 | Band | |
| 2004/0123138 A1 | 6/2004 | Le Saint | |
| 2004/0128506 A1* | 7/2004 | Blakley et al. | 713/170 |
| 2004/0128542 A1* | 7/2004 | Blakley, III et al. | 713/201 |
| 2004/0167871 A1* | 8/2004 | Owen et al. | 707/1 |
| 2004/0167880 A1* | 8/2004 | Smith | 707/3 |
| 2005/0188212 A1* | 8/2005 | Laferriere et al. | 713/185 |

FOREIGN PATENT DOCUMENTS

| | | | |
|---|---|---|---|
| WO | WO0011832 | | 3/2000 |
| WO | WO0172009 | | 9/2001 |
| WO | WO 02/082296 A1 | * | 10/2002 |
| WO | WO2005032041 | * | 4/2005 |

OTHER PUBLICATIONS

Creating Custom Security Tokens; http://msdn.microsoft.com/library/default.asp?url=/library/en-us/wse/html/f1d9ebe0-902a-44d5-92af-e8b2ddc256ab.asp, Oct. 24, 2005.

Specification: WS-Security Profile for XML-based Tokens; http://www-106.ibm.com/developerworks/webservices/library/ws-sectoken.html, Oct. 24, 2005.

Securing .NET Web Services with the WS-Security Protocol; http://www.devx.com/dotnet/Article/19986, Oct. 24, 2005.

The Extensible Markup Language (XML) Configuration Access Protocol: http://www.ietf.org/internet-drafts/draft-ietf-simple-xcap-05.txt, Oct. 24, 2005.

* cited by examiner

SECURITY CLAIM TRANSFORMATION WITH INTERMEDIATE CLAIMS

BACKGROUND

In recent years, the Internet has become one of the most important tools for organizations to communicate and interact with each other. For security reasons, a user in a particular organization often has to be authenticated before being granted access to resources in another organization. Different mechanisms have been developed to facilitate user authentication. One such mechanism is Web Services (WS)-Federation. WS-Federation enables the sharing of identity across enterprise boundaries using Extensible Markup Language (XML) security tokens. These XML tokens utilize formats, such as Security Assertion Markup Language (SAML) or Extensible Rights Markup Language (XrML), and contain rich authorization claims in addition to identity data. For example, under WS-Federation, a security token associated with an account may assert not just the account's identity (e.g. in the form of an email address) but also date of birth, group affiliations, or the like.

Typically, the claims in the security tokens flow between a pair of enterprises. The originator of the tokens is called the Identity Provider. The Identity Provider owns a user's identity and authentication. The consumer of the tokens is called the Resource Provider. The Resource Provider may provide any number of Web Services or other applications. A cryptographic trust may be established between the two parties (for example, the Identity Provider shares his X509 certificate with the Resource Provider) so that the Resource Provider can authenticate the Identity Provider as the authority for security tokens.

In WS-Federation, the Identity Provider typically deploys a server that hosts a Security Token Service (STS). An Identity Provider's STS is generally referred to as STS-IP. The STS-IP authenticates users based on legacy credentials (e.g. username and password) and issues a WS-Federation security token, which will be accepted by the Resource Provider.

Under WS-Federation, it is possible for web services or other applications to have explicit trust with each partner's STS-IP. However, in order to simplify the administration of trust, the Resource Provider generally deploys its own STS, which may be referred to as STS-RP. Individual applications typically trust the STS-RP and a single trust generally exists between STS-RP and STS-IP, which embodies the business level agreement between the two parties. In this manner, each application may be ignorant of the many different Identity Providers.

Although WS-Federation is an effective way to establish trust between two systems, the relationships may become difficult to manage when the systems increase in complexity. Specifically, if a Resource Provider deploys multiple applications, these applications may not all expect security claims in the same format. For example, one application may expect the user's date of birth while another may expect the user's age. Similarly, difficulties may arise if each partner Identity Provider provides claims in different incompatible formats. For this reason, it is often necessary for the STS-RP to perform transformation from the claim format of an Identity Provider to the claim format required by an application.

The conventional way of performing claim transformation involves defining a different claim transformation for each pair of Identity Provider and application. This approach can result in exponential growth of the number of transformation rules relative to the number of Identity Providers and applications. For example, a Resource Provider with 10 trusted Identity Providers and 10 applications would have 100 different claim transformations to define and maintain. The addition of another Identity Provider would necessitate the creation of 10 additional claim transformation rules. This behavior results in considerable complexity for a large scale WS-Federation system.

An effective solution for handling claim transformation without undue complexity continues to elude those skilled in the art.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The systems and methods described herein are directed at transforming security claims in a federated authentication system using an intermediate format. The federated authentication system includes an identity provider and a resource provider. The identity provider receives a request for information from the resource provider to authenticate an account by an application associated with the resource provider. A security claim associated with the account is retrieved where the security claim is provided by an account store in a format specific to the account store. The security claim is transformed from the account store specific format to an intermediate format. The security claim is then transformed from the intermediate format to a federated format recognized by the resource provider. The transformed security claim is provided in a security token to the resource provider. A similar two step transformation process using intermediate claims can also be implemented by the resource provider to transform security claims provided by an identity provider from a federated format to formats recognized by the applications.

Performing security claim transformation using this two step process enables an identity provider in a federated authentication system with M account stores and N resource provider partners to only have M +N transformation rules. Similarly, for a resource provider with M applications and N identity provider partners, only M+N transformation rules are needed. For conventional systems, M×N transformation rules are necessary.

Figure 1:
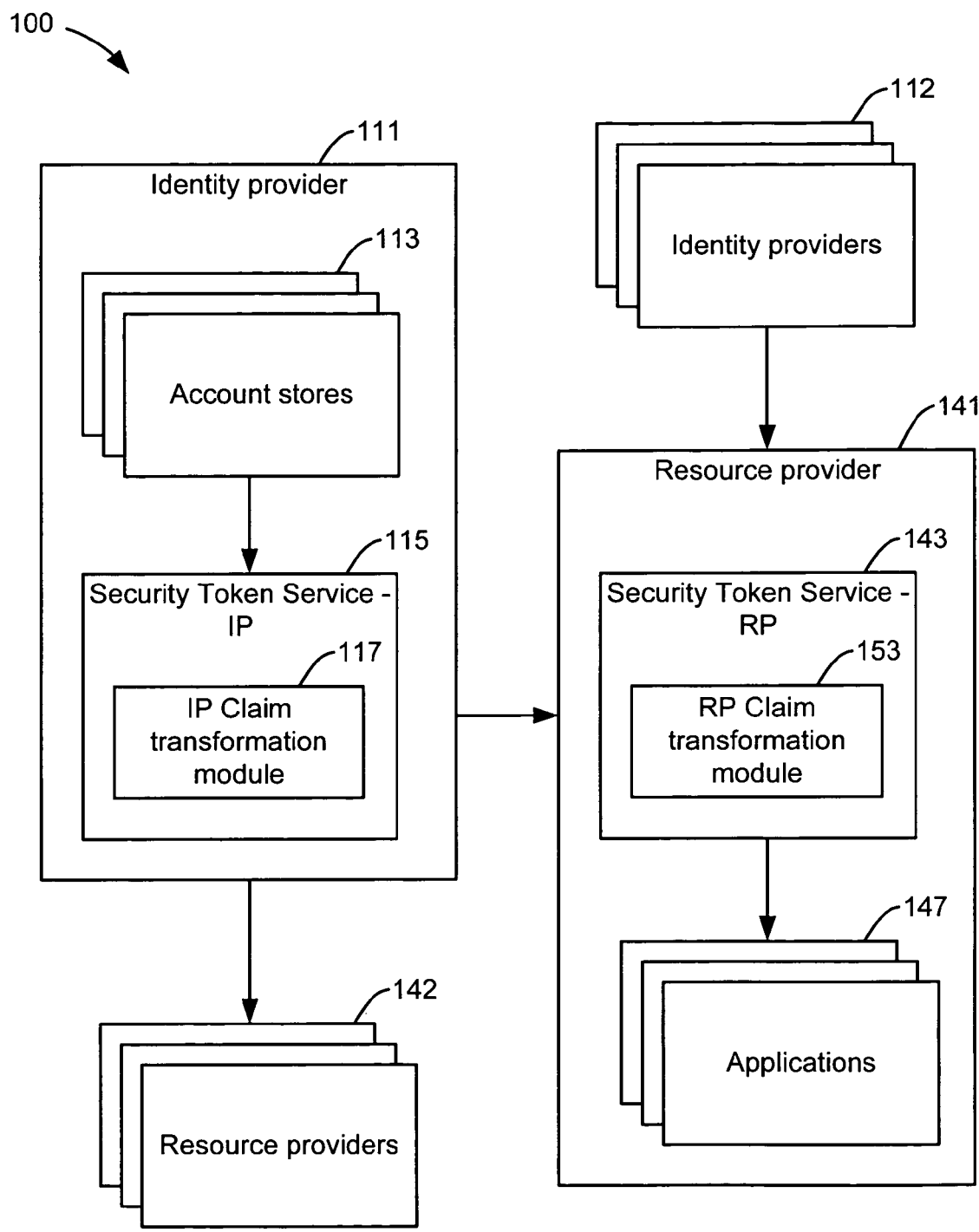
FIG. 1 shows an example system for managing authentication information with intermediate security claim transformation.

FIG. 1 shows an example system 100 for managing authentication information with intermediate security claim transformation. System 100 employs a new technique for transforming claims in a federated identity management environment. System 100 may implement a Web Services (WS) Federation. For example, system 100 may be a WS-Federation configured to provide Web Single Sign-On (Web-SSO) functionalities. As shown in FIG. 1, system 100 includes identity providers 111-112 and resource providers 141-142. Each of the identity providers 111-112 may include a security token service (STS-IP) and an IP claim transformation module. Each of the resource providers 141-142 may include a security token service (STS-RP) and an RP claim transformation module. For illustration purposes, only the example components for identity provider 111 and resource provider 141 are shown.

Identity providers 111-112 are configured to provide information for authenticating accounts (e.g. users) associated with identity providers 111-112. For example, a particular identity provider 111 may be a component in a corporate infrastructure for providing authentication information about employees to other organizations that provides services to those employees. As shown in FIG. 1, identity provider 111 may include account stores 113 and STS-IP 115.

Account stores 113 are components that manage data about users. For example, account stores 113 may include Active Directory (AD), Active Directory Application Mode (ADAM), Structured Query Language (SQL) systems, or the like. The data may include security information associated with the users, such as identity information. The security information typically corresponds to accounts associated with the users. Each of the account stores 113 is configured to provide the security information to security token service 115.

Security information may include any type of information associated with security. For example, a consumer related account store may provide security information that includes name, email address, social security number, date of birth, or the like. The security information provided by an information technology (IT) related account store may include user group membership, access control, user name, password, or the like. A military related account store may provide security information that includes security level, branch of service, security clearance, weapons training, deployment and reserve status, division, rank, or the like.

Typically, the security information provided by account stores 113 is organized in the form of claims. The security claims may be provided in a format that is unique to the account store. For example, a new account store that provides security data in a particular format may be added to account stores 113, which may provide security in a different format. This addition can occur for a variety of reasons, such as to expand the capacity of the current system or when adding with an account store with information about employees of a unit that is newly merged with the organization.

STS-IP 115 is configured to provide security tokens to resource providers 141-142. For example, a particular resource provider 141 may request a user to be authenticated by information from identity provider 111 before the user is granted access to resources. STS-IP 115 is configured to provide security information about the user in the form of a security token to resource provider 141. STS-IP 115 is configured to receive the security information in the form of claims from account stores 113. The claims from different account stores 113 may be in different formats. STS-IP 115 is configured to perform transformation to obtain claims in federated formats that are recognized by resource providers 141-142. As shown in FIG. 1, STS-IP 115 may include IP claim transformation module 117 to perform the transformation.

IP claim transformation module 117 is configured to transform security claims provided by account stores 113 to formats that can be processed by resource providers 141-142. Because identity provider 111 is configured to provide security claims to all of the resource providers 141-142, identity provider 111 would have to include a direct transformation rule for each combination of account stores 113 and resource providers 141-142 in a conventional system. Each of the direct transformation rules is used to transform claims from a format associated with a particular account store to a federated format associated with a particular resource provider. Thus, the number of direct transformation rules grows exponentially with the size of the federated system (e.g. the number of identity providers and resource providers). This behavior is a significant administrative burden.

Example system 100 provides a solution to this adverse behavior by using an intermediate claim format during the claim transformation process. For identity provider 111 in FIG. 1, IP claim transformation module 117 transforms claims in a particular format for processing by STS-RP 143 of resource provider 141. Specifically, IP claim transformation module 117 is configured to transform claims provided by account stores 113 to an intermediate format. The intermediate format is a format that is used in an intermediate step to transform claims from account stores 113 to a transitional format that is not associated to any resource provider. Claims in the account store specific format and claims in the intermediate format contain semantically the same information and, thus, no significant content is lost by the transformation. IP claim transformation module 117 is also configured to transform the claims in the intermediate format to a format that is recognizable by STS-RP 143.

To perform the transformations, IP claim transformation module 117 is configured to maintain transformation rules associated with each of the account stores 113 for transforming claims from formats of the account stores 113 to the intermediate claim format. Typically, intermediate claims are only used by STS-IP 115. IP claim transformation module 117 is also configured to maintain transformation rules associated with each of the resource providers 141-142 for transforming claims from the intermediate format to the formats associated with the resource providers. Using the intermediate format enables identity provider 111 to efficiently transform claims, without having a rule for each combination of account stores 113 and resource providers 141-142. For example, for an identity provider with A number of account stores and in a federated system with B number of resource providers, the identity provider would only need A+B number of transformation rules in the described system, rather than A×B number of rules in a conventional system using direct transformations.

Resource providers 141-142 are configured to provide various kinds of services to users. For example, resource provider 141 in FIG. 1 may be a component in an organization that provides many kinds of services. Resource provider 141 may also be included in an infrastructure that includes one or more organizations for providing a consolidated service solution. Resource providers 141-142 may require that the users be authenticated prior to providing access to the services. Each of the resource providers 141-142 may include a STS- RP to handle information related to account authentication. As shown in FIG. 1, a particular resource provider 141 includes STS-RP 143.

STS-RP 143 is configured to receive security tokens with claims provided by identity provider 111. Typically, each claim is associated with a user or an account that requests access to one of the applications 147 associated with resource provider 141. The claims received from identity provider 111 are generally in a federated format that is not readily usable by applications 147. STS-RP 143 is configured to transform the federated claims to other formats for applications 147. In this example, STS-RP 143 includes RP claim transformation module 153 that is configured to transform the federated claims.

RP claim transformation module 153 is configured to transform federated claims received from identity provider 111 to claims that are usable by applications 147. Applications 147 can include any type of computer executable components for providing functionalities, such as web services. RP claim transformation module 141 typically receives claims that are in a federated format that cannot be used by applications 147. Similar to IP claim transformation module 117, RP claim transformation module 141 is configured to transform each received claim using an intermediate step, instead of directly transforming a federated claim to an application specific claim. Specifically, RP claim transformation module 141 is configured to transform each received claim from the federated format to an intermediate format. RP claim transformation module 141 is also configured to transform the claim in the intermediate format to a format recognized by one or more of applications 147 to which the claim is destined. To perform the transformations, RP claim transformation module 141 is configured to maintain transformation rules associated with each of the applications 147. The rules are used to transform the claims from the intermediate format to the application specific formats.

In one example implementation, system 100 may be implemented as part of Active Directory Federation Services (ADFS). STS-IP 115 and STS-RP 143 may be implemented as Federation Services (FS). The components in example system 100 are shown in FIG. 1 for illustrative purpose. Actual implementation may include more, less or different components that provide similar functionalities as discussed above. Also, example system 100 is illustrated in FIG. 1 as a federated authentication system. A non-federated system may also implement the two-step security claim transformation technique with intermediate claims, as discussed above. For example, a non-federated system may include a security token service (STS) that serves both account stores and applications. In this system, the STS may transform claims from an account store specific format to an intermediate format, and then from the intermediate format to an application specific format.

Figure 2:
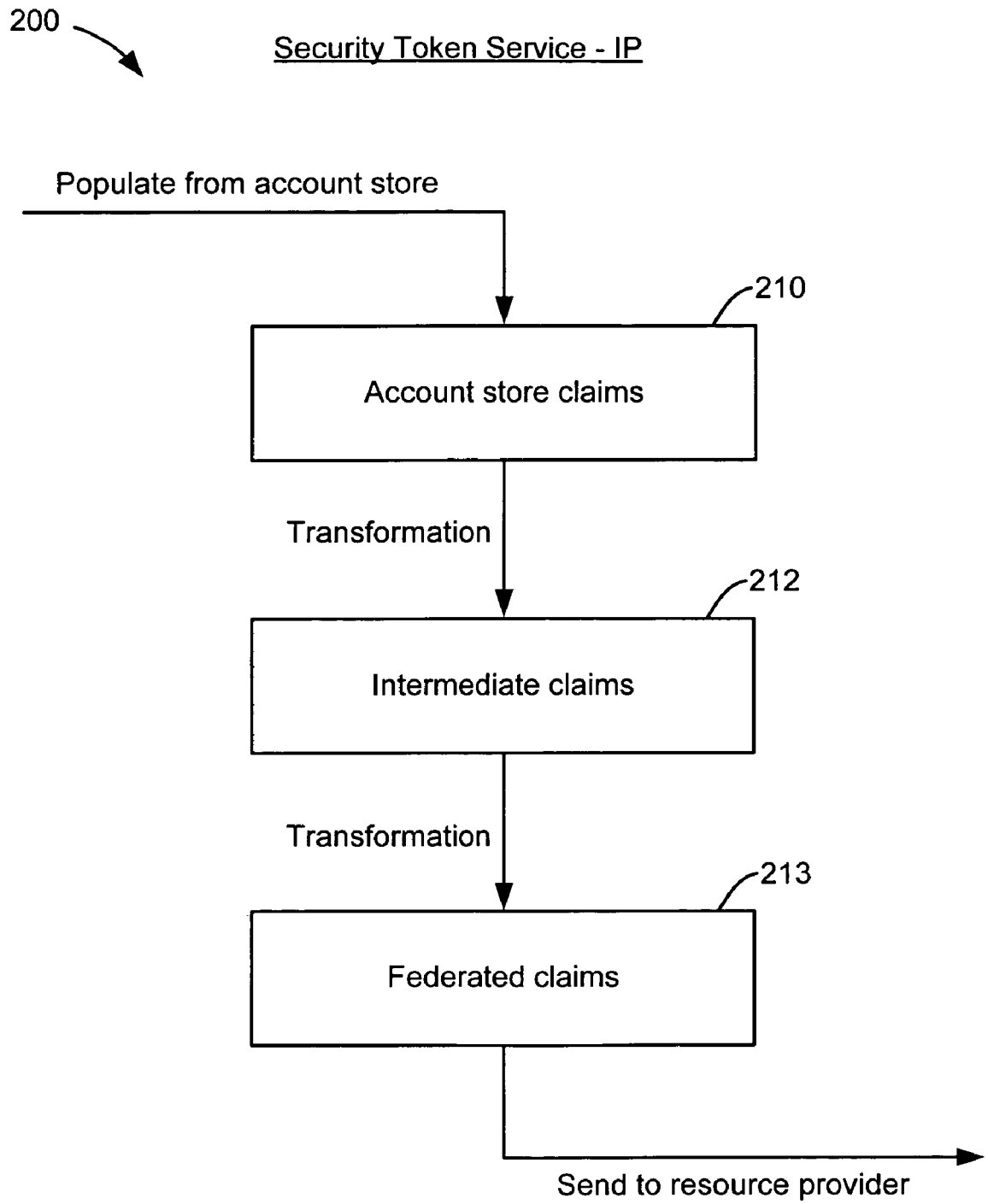
FIG. 2 shows an example workflow for creating security tokens using intermediate claim transformation.

FIG. 2 shows an example workflow 200 for creating security tokens using intermediate claim transformation. Workflow 200 may be associated with a security token service in an identity provider. As shown in FIG. 2, the workflow begins when the security token service retrieves account store claims 210 in response to a request from a resource provider for authentication data. The account store claims are populated with information from an account store. The account store claims are transformed from an account store specific format to an intermediate format using a transformation rule associated with the account store. The resulted intermediate claims 212 are then transformed from the intermediate format to a federated format associated with the resource provider. The resultant federated claims 213 are then sent to the resource provider. Federated claims 213 are typically embodied in one or more security tokens.

Figure 3:
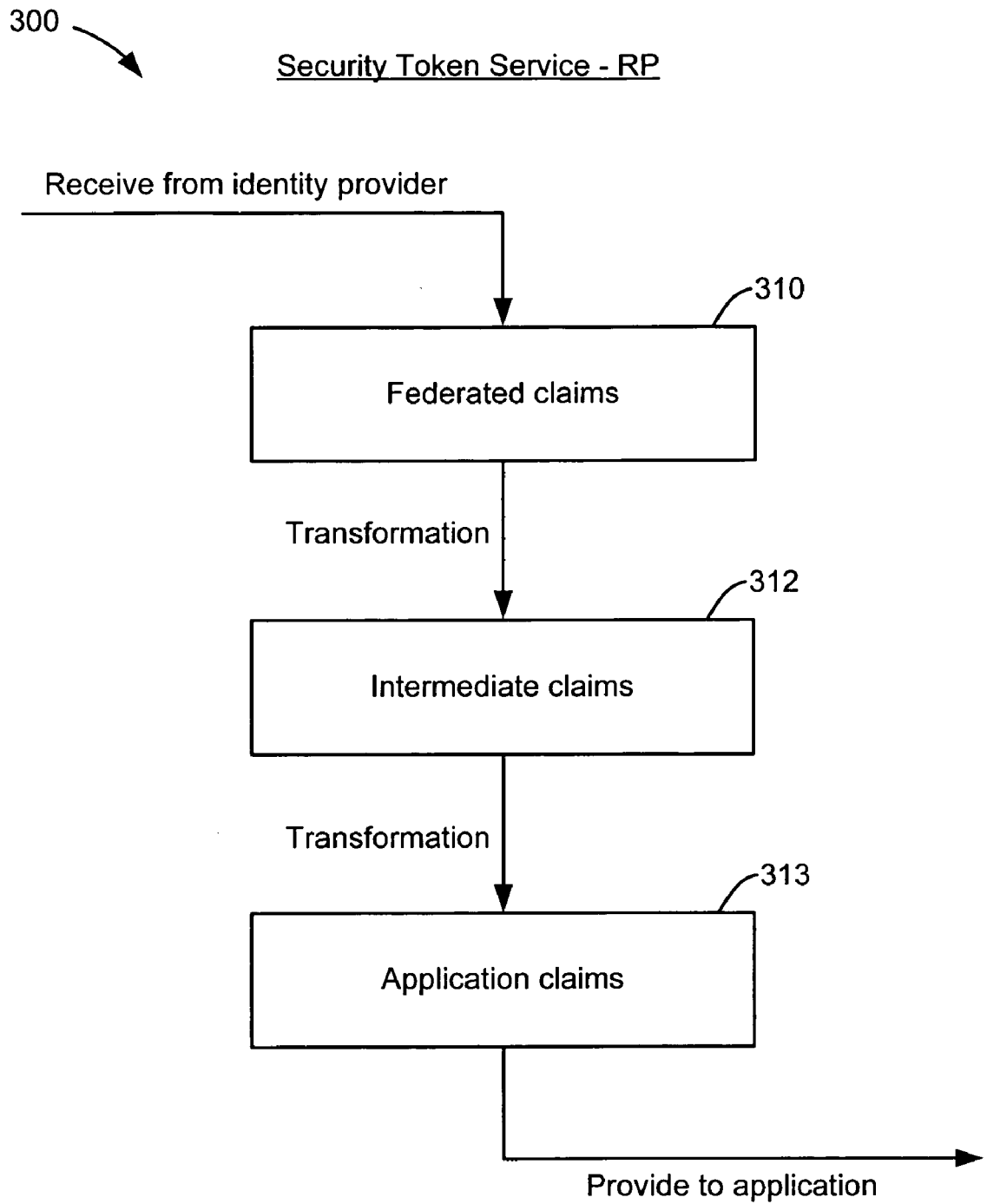
FIG. 3 shows an example workflow for processing security tokens using intermediate claim transformation.

FIG. 3 shows an example workflow 300 for processing security tokens using intermediate claim transformation. Workflow 300 may be associated with a security token service in a resource provider. In FIG. 3, a security token is received from an identity provider and includes federated claims 310, which are in a federated format for communicating security information between the resource provider and the identity provider. Federated claims 310 are destined to an application associated with the resource provider. Federated claims 310 are transformed to an intermediate format as intermediate claims 312. Intermediate claims 312 are then transformed from the intermediate format to a format specific to the application to which the claims are destined. These application claims 313 are enabled for the resource application to process.

Figure 4:
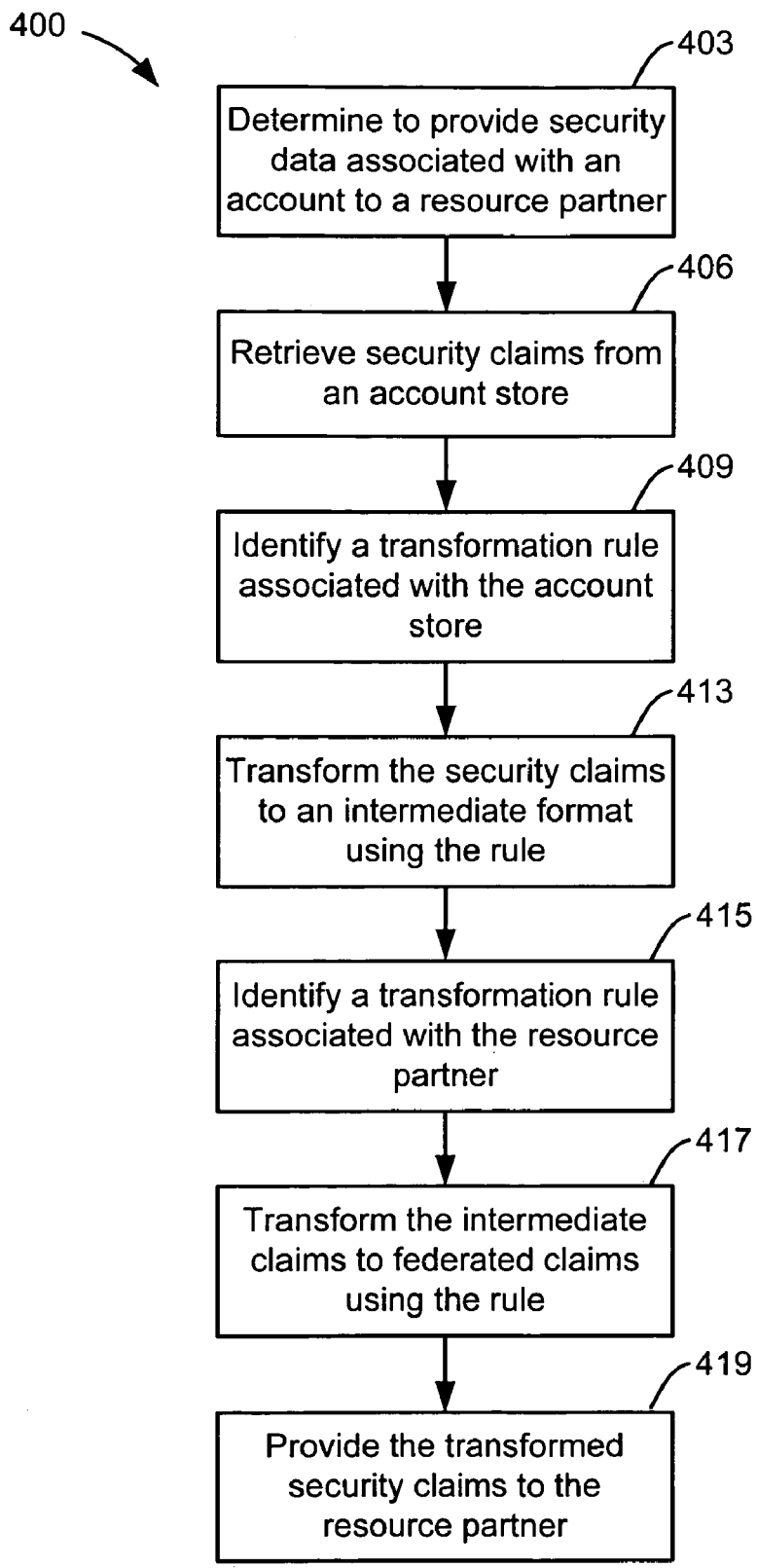
FIG. 4 shows an example process for providing account authentication information from an identity provider to a resource provider in a WS-Federation environment.

FIG. 4 shows an example process 400 for providing account authentication information from an identity provider to a resource provider in a WS-Federation environment. Process 400 may be implemented by a security token service module of an identity provider to provide the security claims that can be delivered to and processed by a resource partner. At block 403, process 300 determines to provide security data associated with an account. The security data may be provided in response to a request by a resource partner. At block 406, security claims are retrieved from an account store that provides the claims. The security claims may be in a format that is unique to the account store and is not usable by other applications. At block 409, a transformation rule associated with the account store is identified. At block 413, the security claims are transformed using the identified rule from an account store specific format to an intermediate format. At block 415, another transformation rule associated with a resource partner is identified. At block 417, the intermediate claims are transformed from the intermediate format to a federated format associated with the resource partner using the other transformation rule. At block 419, the transformed security claims are provided to the resource partner. An example process for handling security claims by the resource partner will be discussed below in conjunction with FIG. 5. Generally, the transformed security claims are included in a security token.

Figure 5:
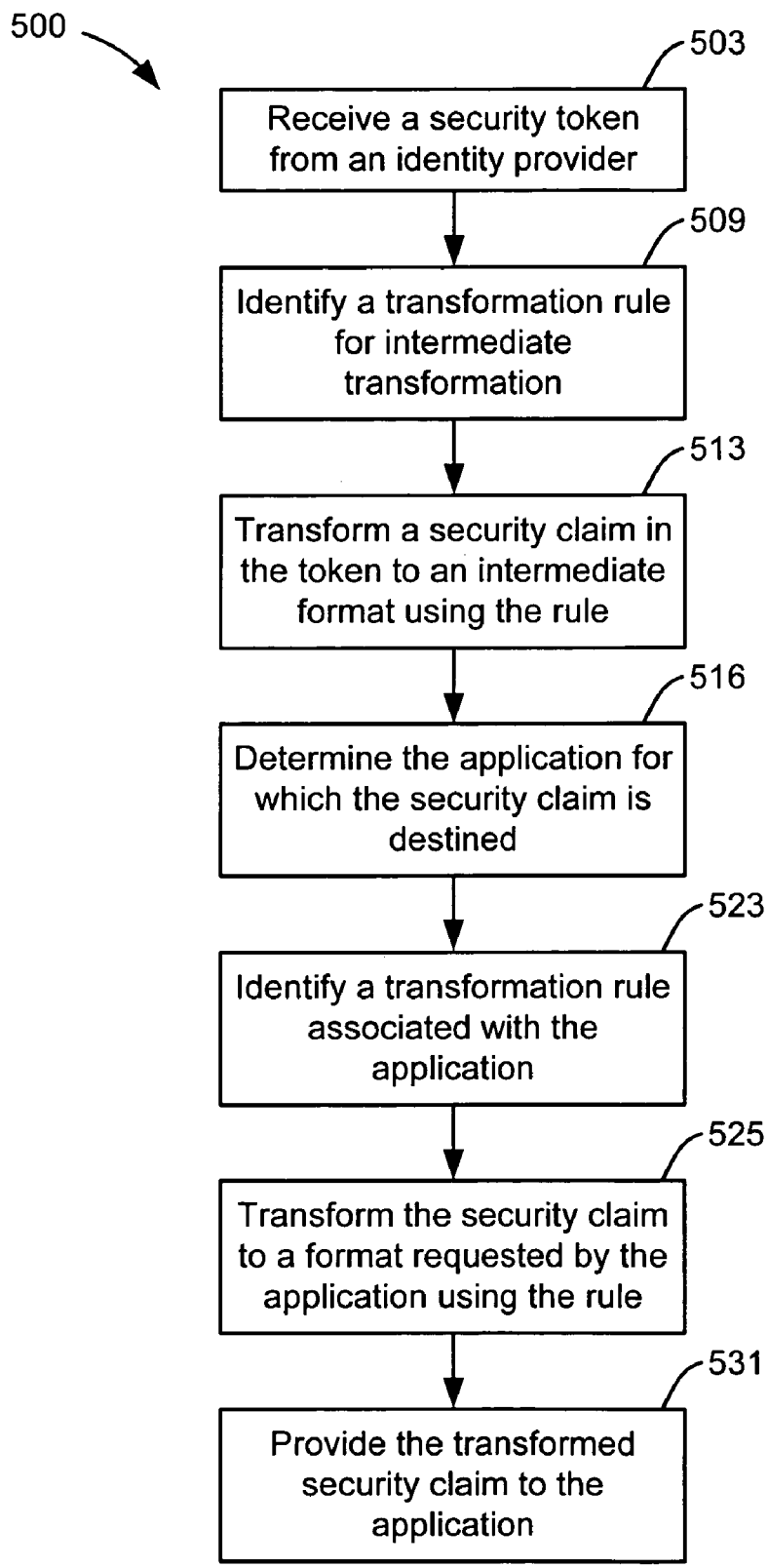
FIG. 5 shows an example process for providing account authentication information received from an identity provider to applications.

FIG. 5 shows an example process 500 for providing account authentication information received from an identity provider to an application. Process 500 may be implemented by a security token service of a resource provider to provide security claims that can be used by an application associated with the resource provider.

At block 503, a security token is received from the identity provider. The security token typically includes security claims. The security claims are typically in a federated format for communicating security data between the identity provider and the resource provider. At block 509, a transformation rule associated with an intermediate transformation step is identified. At block 513, a security claim in the security token is transformed from the federated format to an intermediate format using the rule. At block 516, the application for which the security claim is destined is determined. At block 523, another transformation rule associated with the application is identified. The other transformation rule may be used to transform a claim from the intermediate format to a format specific to the associated application. At block 525, the security claim is transformed to the application specific format using the other transformation rule. At block 531, the transformed security claim is provided to the application.

Figure 6:
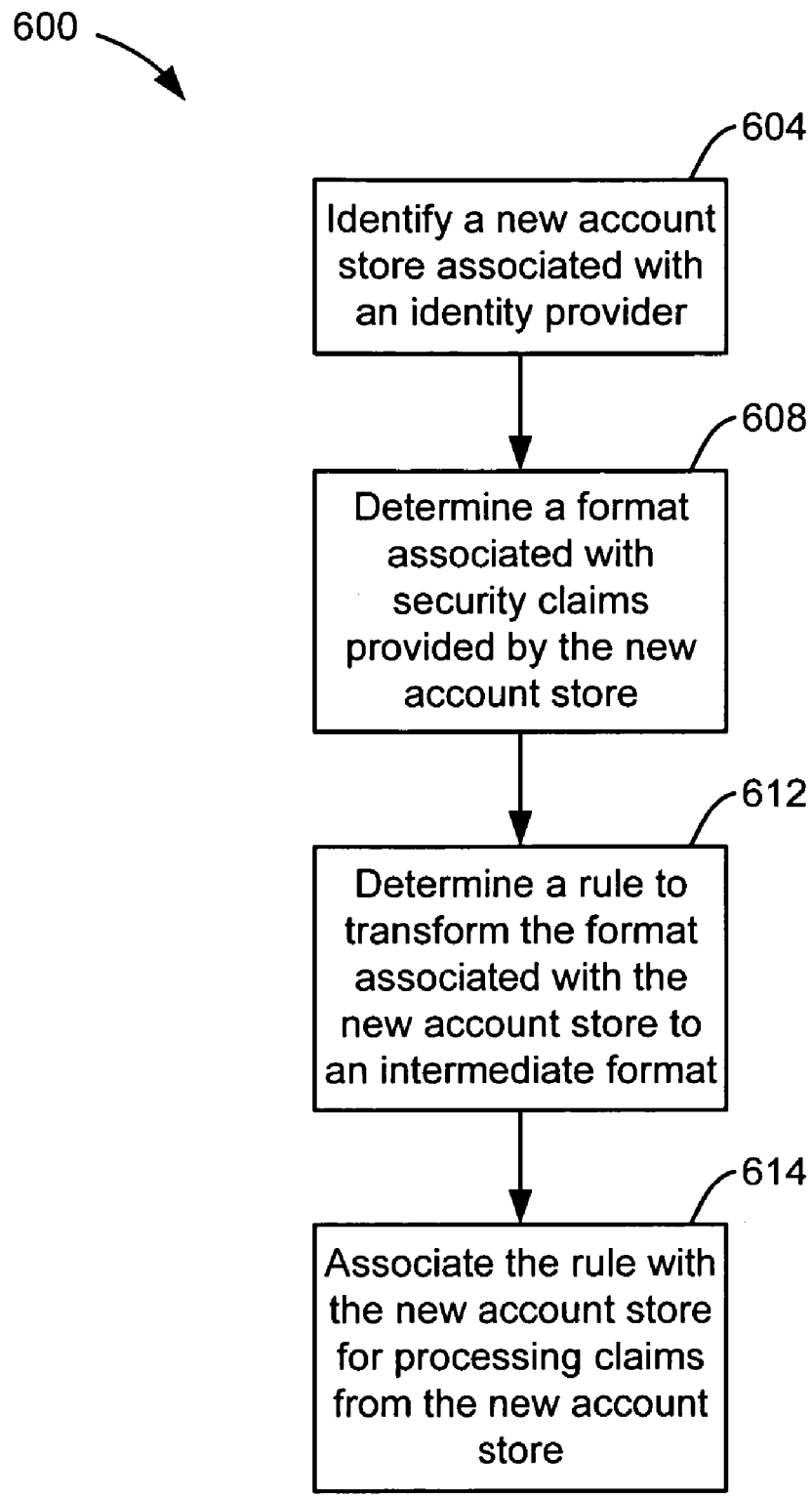
FIG. 6 shows an example process for enabling a WS-Federation system to handle authentication information associated with a new account store.

FIG. 6 shows an example process 600 for enabling a WS-Federation system to handle authentication information associated with a new account store. Process 600 may be implemented to configure a security token service in an identity provider to provide security claims from the new store that are usable to a resource provider. At block 604, a new account store associated with an identity provider is identified. At block 608, a format associated with security claims provided by the new account store is identified. At block 612, a rule to transform the format associated with the new account store to an intermediate format is determined. The intermediate format can be handled by a security token service of the resource provider. At block 614, the rule is associated with the new account store. The rule is used by the security token service of the identity provider to process claims from the new account store. A process similar to process 600 may be used to determine a transformation rule and to associate the rule with a new resource provider partner.

Figure 7:
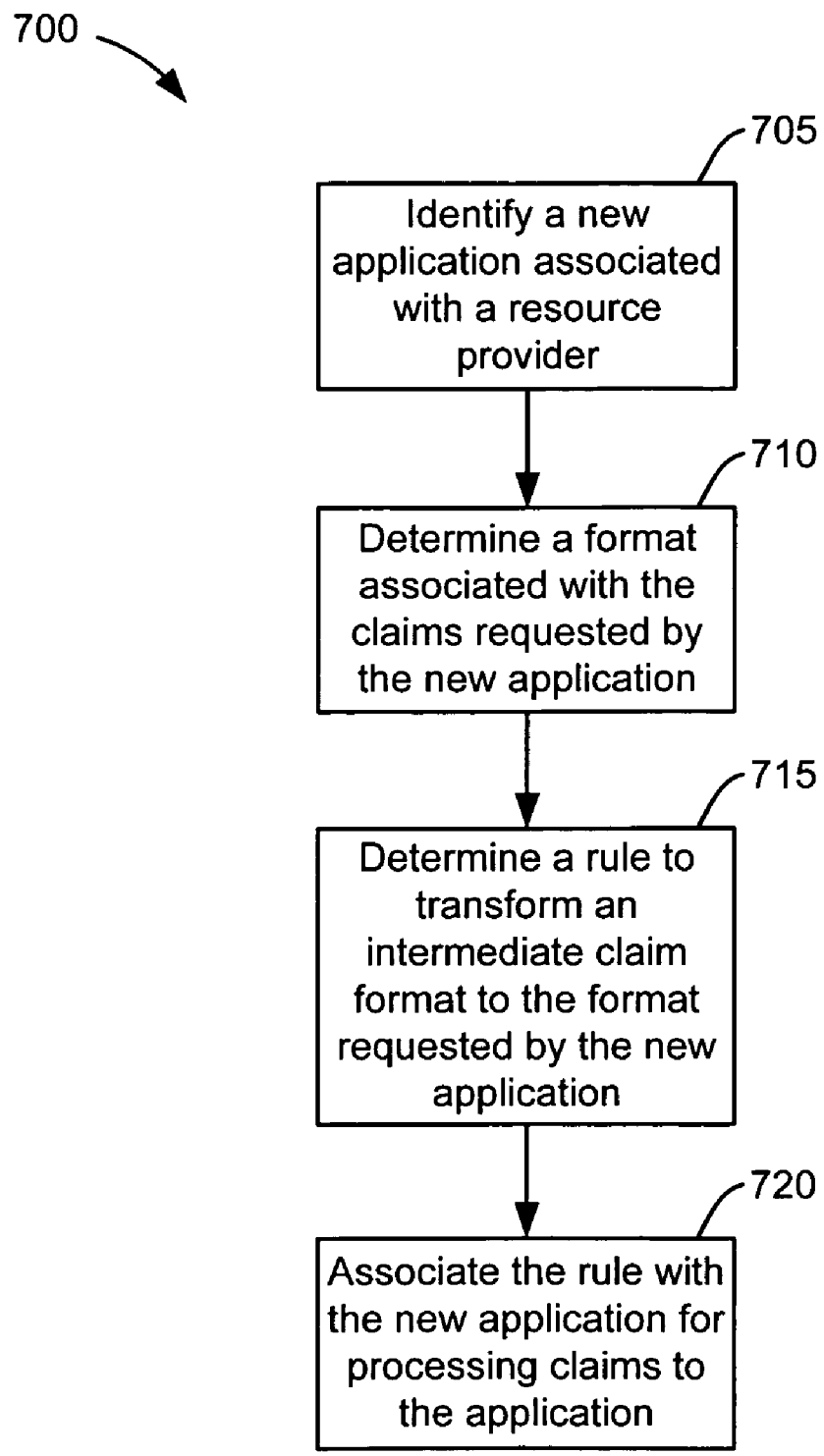
FIG. 7 shows an example process for enabling a resource provider in WS-Federation system to handle authentication information for a new application.

FIG. 7 shows an example process 700 for enabling a resource provider in WS-Federation system to handle authentication information for a new application. At block 705, the new application associated with the resource provider is identified. At block 710, a format associated with claims requested by the new application is determined. At block 715, a rule to transform an intermediate claim format to the format associated with the new application is determined. At block 720, the rule is associated with the new application. The rule is used by the security token service to process claims destined for the application. A process similar to process 700 may be used to determine a transformation rule and to associate the rule with a new identity provider partner.

Below is a discussion of one particular example implementation of the system described above. In the example, the above system is implemented as a Federation Service (FS). A FS is designed to allow the trusted exchange of arbitrary claims containing arbitrary values. These claims may be used to make authorization decision by the receiving party. The list of claim types supported by the FS includes UPN, Email, Common Name, Group, and Custom. Any set of claims may be expressed as a tuple of the claim type and its value. For example, an example set of claims may include a UPN claim, a Group claim, and a custom SSN claim. These claims may be expressed as follows:

(UPN, user1@ntdev.corp.companya.com)
(Group, Developer)
(SSN, 123-45-6789)

Since claims are assigned semantic value by the FS, the values of the claims typically fall within certain norms. If claims are received that do not meet the criteria given below, the request may fail with an error and an event will be logged. Although this technique falls under the FS, the same technique for handling claims applies at the WS.

The UPN claim type may indicate Kerberos style user principal names of the form user@realm. Only one claim may have the UPN type. This may be referred to as the "UPN claim".

The Email claim type may indicate RFC2822 (Resnick, P., Editor, "Internet Message Format", RFC 2822, April 2001) style email names of the form user@domain. Only one claim may have the Email type. This may be referred to as the "Email claim".

The Common Name claim type may indicate an arbitrary string used for personalization. Only one claim may have the Common Name type. There may not be a mechanism for guaranteeing the uniqueness of the Common Name claim. Therefore, care should be exercised when using this claim type in authorization decisions.

The Group claim type may indicate membership in a group or group. Administrators may define individual claims that have the Group type: "Group claims". For example, an administrator may define a set of Group claims: [Developer, Tester, Program Manager]. Each Group claim is a separate unit of administration for claim population and transformation. The value of a Group claim may be considered a Boolean indicating membership.

The Custom claim type is an extensibility point to allow FS administrators to communicate any authorization information that does not fall under the other claim types. This claim type is extensible. Administrators may specify a fixed set of custom subtypes. For example, the Custom claim type may be extended by specifying the list: [SSN, Hair Color, Shoe Size]. Each custom subtype is a separate unit of administration for claim population and transformation. The value of a specific custom subtype claim is an arbitrary string that will be exposed to the end application.

Some Group and Custom claims may be designated as sensitive, which indicates that the claim value will not be audited when the claim is produced or transformed. The audit will indicate the name of the claim but the value of the claim will be omitted. An example of a sensitive claim would be Social Security Number.

A claim set is a list of defined claims. A claim set contains at least one of the UPN, Email, or Common Name claims. The claim set may define zero or more Group claims and Custom claims. A claim set defines a claim language that can be used within a corporation or between two agreeing corporations. When used between two corporations, a claim set is the incarnation of a business level agreement to exchange the defined authorization data.

Below are three examples of claim sets:
(UPN, Group=[Developer, Tester, PM], Custom=[SSN])
(Email, Common Name, Group=[Analyst, Adjustor])
(Common Name, Custom=,[Favorite Color])

Below is an example of the data that may be transmitted in a token using the claim set above:
(UPN=user1@ntdev.corp.companya.com,
Group=[Developer],
Custom=[SSN=000-00-0000])

Each external entity that communicates with the FS has an associated claim set. This includes Account Partners, Resource Partners, Account Stores, and Applications. The claim set defines the "language" that will be used by the FS to communicate with that entity.

The FS also has its own claim set, which may be called the "Intermediate Claimset". This is the language of the FS itself and of any application that the FS services.

The FS brokers trust between many disparate entities. Three example basic flows through the FS include:
Federated FS-A: Account Store->Resource Partner
Federated FS-R: Account Partner->Application
Non-Federated FS: Account Store->Application It is possible for an FS to be configured to act in all three of the above groups. The FS receives claims that are formatted according to an incoming claimset and the FS wishes to pass the claims using a different claimset. It may therefore be necessary to define a "transformation" between the two claimsets.

Transformations may be individually administered between any two entities which would need to communicate, in a straightforward way. For example, in the Federated FS-A scenario, given x account stores and y resource partners, this would necessitate the individual administration of xy different transformations. The administrative burden of this model was judged to be too great. This led to the introduction of an intermediate claim set.

The intermediate claim set is a claim set associated with the FS itself. All incoming claims are transformed into the intermediate claim set, and all internal FS actions are performed on that claim set.

With an intermediate claim set, transformations need not be individually administered between any two entities which need to communicate; rather, each entity shall define a single transformation to or from the intermediate claim set. In this way, the administrative complexity of the Federated FS-A scenario with x account stores and y account partners is reduced to x+y, instead of xy. As a concrete example, an FS with 3 account stores and 7 resource partners need only administer 10 claim transformations under this design, compared to 21 when transformation occurs directly from the incoming claim set to the outgoing.

As examples, given the intermediate claim set (UPN, Group=[Developer, Tester, PM], Custom=[SSN]), an appropriate application claim set might be (UPN) or (UPN, Group=[Developer], Custom=[SSN]). The claim set (UPN, Group=[Dev, Test], Custom=[SocSec]) may not be valid because the Group claims Dev and Test and the Custom claim SocSec are not defined in the intermediate claim set.

Claim transformations may use string comparisons, which may be case sensitive.

Email claim types always transform to Email claim types. As part of this transformation, on FS-A, the domain suffix may be transformed to a constant value. On FS-R, the domain suffix may be filtered against a list of constant values.

Below are two examples. These examples assume a federation between two corporations, Company A and Company B, where Company A is the account realm and Company B is the resource realm.

EXAMPLE 1

Company A acting as a federated FS-A, will transform the Email intermediate claim to the outgoing Email claim for Company B, and as part of that transformation, it will transform all email suffixes to "companya.com". Given the intermediate Email claim (Email=user1@windows.companya.com), the outgoing Email claim would be (Email=user1@companya.com).

EXAMPLE 2

Company B acting as a federated FS-R, will transform the incoming Company A Email claim to the Email intermediate claim and as part of that transformation, supply the suffix list "companya.com" to be filtered against. Therefore, an incoming Company A Email claim (Email=user1@companya.com) would be accepted, but an incoming Company A Email claim (Email=user1@companyb.com) would be rejected.

UPN claim types always transform to UPN claim types. They are subject to suffix transformations and filtering in the same way that Email claims are. However, there is one special case scenario. Since Active Directory (AD) allows UPNs without the @ sign, such scenario will be supported, as follows. On the account side, if there is a UPN suffix transform defined, the @ sign will be supported followed by the suffix. Otherwise, if any suffix is passed through, the UPN is supported without the @ sign. On the resource side, if any UPN suffix is allowed, the UPN without the @ sign will be accepted. Otherwise, if there is(are) a specific allowed UPN suffix(s) configured, the UPN without the @ sign will be rejected.

Common Name claim types always transform to Common Name claim types. They are subject to no additional rules out of the box.

SAML tokens require that there be one claim which is essentially the "identity" claim (e.g. the content of the NameIdentifier element). In addition, the ASP.Net identity interface has a similar concept with the Name property. Of the following claim types, Email, UPN and Common Name will be supported as "identity" claims. If more than one of these claim types are presented in a token, the following is the order in which the "identity" claim will be populated: UPN—first, Email—second, Common Name—third. At least one of these claim types may be present in order for a token to be issued.

Group claims types transform to other Group claim types. For example, given an incoming claim set of (UPN, Group=[Foo, Bar, Baz]) and an intermediate claim set of (UPN, Group=[X,Y,Z]), transformations Foo->Y, Bar->X, and Baz->Z may be created.

Custom claim types always transform to other Custom claim types. For example, given an incoming claim set of (UPN, Custom=[SSN, HairColor]) and an intermediate claim set of (UPN, Custom=[SocSec, Hair]), transformations SSN->SocSec and HairColor->Hair may be created.

In addition to the standard transformations described above, a special Group->UPN transformation may also be used. The Group->UPN claim transformation may be supported on a federated FS-R when claims are incoming from a Trusted Account Partner. In this scheme, UPN does not transform to UPN. Rather, the administrator provides an ordered list of Group->UPN transformations. For example, the Group->UPN list may be (Dev->companya-dev@internalforest.com, Test→companya-test@internalforest.com, PM->companya-pm@internalforest.com). Given an incoming claim set of (UPN=user1@companya.com, Group=[Dev]), the intermediate claim set would contain (UPN=companya-dev@internalforest.com). Since the list is ordered, a claim set of (UPN=davemo@companya.com, Group=[Dev,PM]) may result in (UPN=companya-dev@internalforest.com). This special transformation rule may support group-based shadow accounts accessing legacy resources. The order of the group to UPN transformations may be specified in the FS policy.

The FS administrator may specify a pluggable module to perform claim transformation. If a customer desires any more complex logic for transformation than provided by the simple rules above (for example, automatic conversion of various currencies to USD), the customer may implement a pluggable transformation module.

The federation server's trust brokerage defines an example set of actors that produce or consume claims:
AD Account Authority
Lightweight Directory Access Protocol (LDAP) Account Store
Partner Realm
Claim Based Application
Traditional Windows Application The AD Account Authority is a claim producer that represents all of the authentication powers the FS receives when joined to a domain. Specifically, the FS may log on users from its domain, from domains that are directly trusted by its domain, from domains in the same forest as its domain, and from domains in forests that have cross forest trusts with its domain's forest.

The Active directory may have a default URI and display name as follows

URI—"urn:federation:activedirectory"

Display Name—"Active Directory"

An LDAP account store is a claim producer that represents an individual LDAP directory that holds user account information. Both AD and AD/AM are supported LDAP Account Stores.

A Partner Realm can either produce or consume claims, and represents another Federation Server or interoperable trust partner.

A Claim Based Application is an ASP.NET application that has been written using the WebSSO library and is fully capable of using the WebSSO claims to directly make authorization decisions.

A Traditional Windows Application is an existing application that has been written to use WINDOWS® native authorization mechanisms and is not prepared to consume the WebSSO claims. An example is Sharepoint.

To account for the administration of the five different Claim Producers, six different scenarios may be considered because the Foreign Realm may act in a Trusted or Trusting Group.

AD Account Authority
LDAP Account Store
Trusted Partner Realm
Trusting Partner Realm
Claim Based Application
Traditional Windows Application There are similarities in the administration of different parties that produce and accept claims but each of these is defined herein in detail.

AD Account Authority is only available if the FS is joined.

UPN Claim: When the AD Account Authority is configured, the UPN claim is automatically enabled.

Email Claim: When the AD Account Authority is configured, the FS Administrator will specify what LDAP user attribute, if any, contains the user's email address.

Common Name Claim: When the AD Account Authority is configured, the FS Administrator will specify what LDAP user attribute, if any, contains the user's common name.

Group claims: Windows users and groups may be directly assigned to the Intermediate Groups using object picker.

Custom Claims: When the AD store is configured, the FS Administrator will specify what LDAP user attributes contain claim values. Then he will assign each attribute name to an Intermediate Custom claim.

For AD/AM Account Store,

UPN Claim: When the AD/AM account store is configured, the FS Administrator will specify the LDAP user attribute, if any, containing the user's UPN.

Email Claim: When the AD/AM account store is configured, the FS Administrator will specify the LDAP user attribute, if any, containing the user's email address.

Common Name Claim: When the AD/AM account store is configured, the FS Administrator will specify the LDAP user attribute, if any, containing the user's common name.

At least one of the above claim types may be assigned from the AD/AM account store in order for the FS allow that store to be enabled.

When the AD/AM account store is configured, the FS Administrator will specify the LDAP user attribute containing the user's LDAP Groups. In addition, the administrator will provide a list of acceptable LDAP Groups. He will assign each possible LDAP Group to an Intermediate Group.

Custom Claims: When the AD/AM account store is configured, the FS Administrator will specify the LDAP user attributes containing claim values. Then he will assign each attribute name to an Intermediate Custom claim.

A Trusted Partner Realm produces claims that the FS consumes. Note that in the case of Partner Realms, much of the information that we say "the FS Administrator will specify" may actually be exchanged in the trust setup, and it will be sufficient for the FS Administrator to approve the values received from the Foreign Realm.

UPN Claim: When the Trusted Partner Realm is configured, the FS Administrator will specify a set of UPN domains/suffixes that may be accepted from the Partner Realm. If an UPN Identity is received whose domain part is not in the list, the request will be rejected. No transformation may be performed at this time.

Email Claim: When the Trusted Partner Realm is configured, the FS Administrator will specify a set of email domains/suffixes that may be accepted from the Partner Realm. If an Email Identity is received whose domain part is not in the list, the request will be rejected. No transformation may be performed at this time.

Common Name Claim: This type of claim may not be transformed and is simply passed through.

Group claims: When the Trusted Partner Realm is configured, the FS Administrator will specify a set of Incoming Groups that may be accepted from the Foreign Realm. He will associate each possible Incoming Group with an Intermediate Group (note that this creates a Group Transform). If an Incoming Group is encountered at runtime that has no transform, it will be discarded.

Custom Claims: When the Trusted Partner Realm is configured, the FS Administrator will specify a set of Incoming Names of Custom claims that will be accepted from the Foreign Realm. He will map each possible Incoming Name to an Intermediate Custom claim (note that this creates a Name Transform). If an Incoming Custom claim is encountered at runtime that has no transform, it will be discarded.

A Trusting Partner Realm accepts claims that the FS sends in WebSSO security tokens. Note that in the case of Partner Realms, much of the information that we say "the FS Administrator will specify" may actually be exchanged in the trust setup, and it will be sufficient for the FS Administrator to approve the values received from the Foreign Realm.

UPN Claim: When the Trusting Partner Realm is configured, the FS Administrator will specify if the UPN claim is to be sent to the Trusting Partner. A suffix transformation may also be specified so that any suffix will be transformed into a specified suffix, note that only one outgoing suffix may be specified. An example of a suffix transformation is user2@ntdev.corp.companya.com may be transformed to user2@companya.com.

Email Claim: When the Trusting Partner Realm is configured, the FS Administrator will specify if the Email claim is to be sent to the Trusting Partner. A suffix transformation may also be specified so that any suffix will be transformed into a specified suffix, note that only one outgoing suffix may be specified. An example of a suffix transformation is user2@windows.companya.com may be transformed to user2@companya.com.

Common Name Claim: This type of claim may not be transformed and is simply passed through to the Trusting Partner if selected.

Group claims: When the Partner Realm is configured, the FS Administrator will specify a set of Outgoing Groups that will be accepted by the Partner Realm. He will associate each possible Outgoing Group to Intermediate Groups (note that this creates a set of Group Transforms). Intermediate Groups that match no Outgoing Group will be discarded.

Custom Claims: When the Partner Realm is configured, the FS Administrator will specify a set of Outgoing Custom claims that will be accepted by the Partner Realm. He will map each possible Outgoing Custom claim to an Intermediate Custom claim (note that this creates a set of Name Transforms). Intermediate Custom claims that match no Outgoing Custom claim will be discarded.

A Claim Based Application accepts claims that the FS sends in WebSSO security tokens. Claim transformation does not actually occur when claims are sent to an application (see the section on the pluggable claim transformation module above for an exception to this statement). Instead Intermediate Claims are sent to the application. Having said this not all Intermediate Claims are sent to the application, only the claims specified by the FS Administrator will be sent to the application. By default no Intermediate Claims which are marked as sensitive will be specified and all non-sensitive claims will be specified. What this means is that the FS administrator will opt in for sensitive claims to be sent to the application and will opt out for non-sensitive claims.

UPN Identity Claim/Email Identity Claim/Common Name Identity Claim: When the Application is configured, the FS Administrator will specify which of the identity claims will be sent to the Application. No transformation or filtering is performed.

Group claims: When the Application is configured, the FS Administrator will specify the Intermediate Groups that will be sent to the Application. Intermediate groups that are not designated to be sent to the Application will be discarded.

Custom Claims: When the Application is configured, the FS Administrator will specify the Intermediate Custom claims that will be sent to the Application. Intermediate Custom claims that are not designated to be sent to the Application will be discarded.

When the Application is configured, it has the option of being marked "Traditional WINDOWS®". Traditional WINDOWS® Applications may only be used by WINDOWS® users from the local realm, this means users who can logon to the box using traditional WINDOWS® authentication techniques. Note that in federation scenarios this means that the shadow accounts will be required. The WebSSO token that is sent to Traditional Windows Applications will contain the UPN claim for the user, and may also contain custom claims with the SIDs of the user account. The Resource will then use either S4U or the WebSSO Auth Package to generate a NT impersonation level token.

Figure 8:
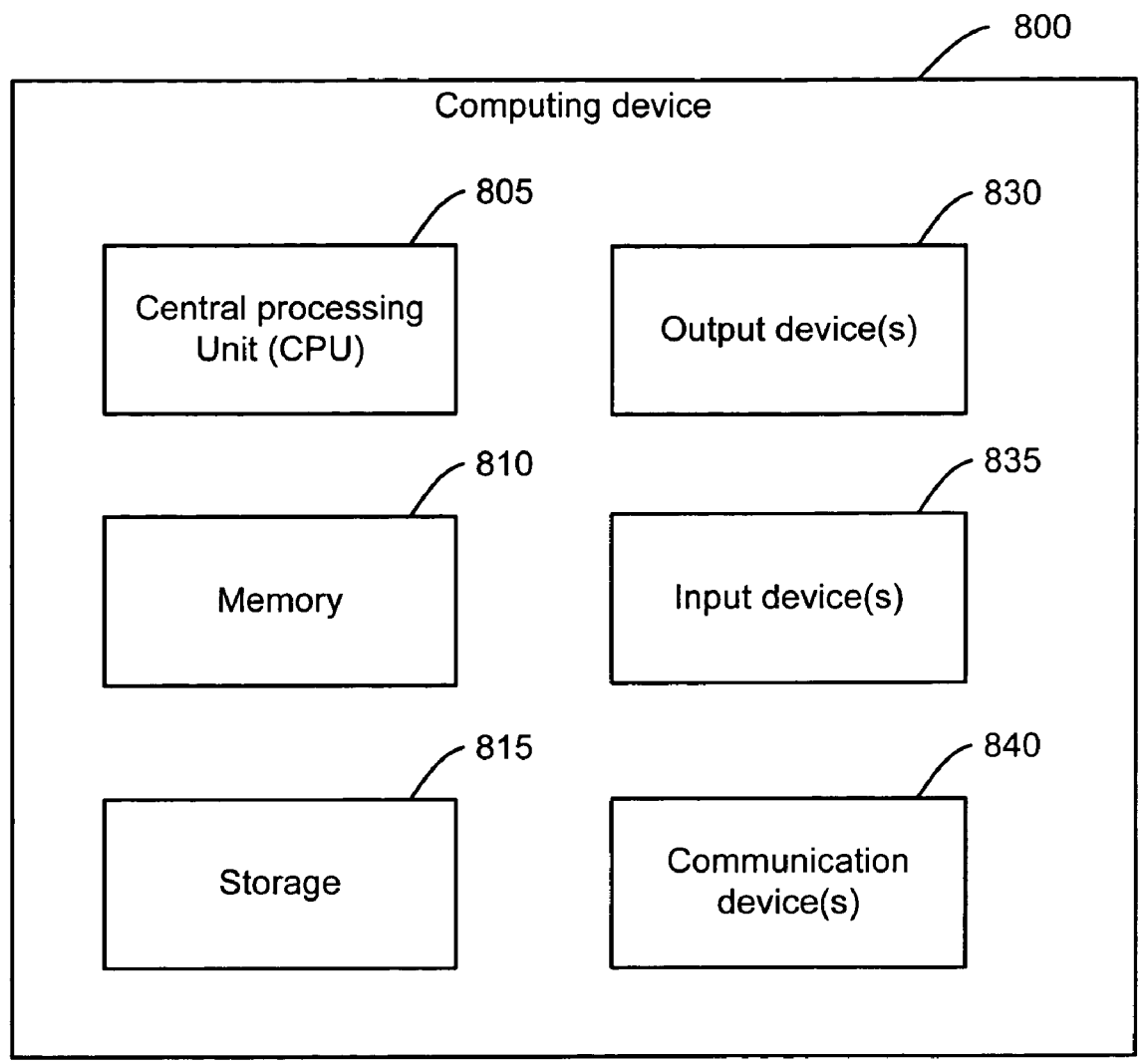
FIG. 8 shows an exemplary computer device for implementing the described systems and methods.

FIG. 8 shows an exemplary computer device 800 for implementing the described systems and methods. In its most basic configuration, computing device 800 typically includes at least one central processing unit (CPU) 805 and memory 810.

Depending on the exact configuration and type of computing device, memory 810 may be volatile (such as RAM), non-volatile (such as ROM, flash memory, etc.) or some combination of the two. Additionally, computing device 800 may also have additional features/functionality. For example, computing device 800 may include multiple CPU's. The described methods may be executed in any manner by any processing unit in computing device 800. For example, the described process may be executed by both multiple CPU's in parallel.

Computing device 800 may also include additional storage (removable and/or non-removable) including, but not limited to, magnetic or optical disks or tape. Such additional storage is illustrated in FIG. 8 by storage 815. Computer storage media includes volatile and nonvolatile, removable and non-removable media implemented in any method or technology for storage of information such as computer readable instructions, data structures, program modules or other data. Memory 810 and storage 815 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 800. Any such computer storage media may be part of computing device 800.

Computing device 800 may also contain communications device(s) 840 that allow the device to communicate with other devices. Communications device(s) 840 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 800 may also have input device(s) 835 such as keyboard, mouse, pen, voice input device, touch input device, etc. Output device(s) 830 such as a display, speakers, printer, etc. may also be included. All these devices are well know in the art and need not be discussed at length.

While the preferred embodiment of the invention has been illustrated and described, it will be appreciated that various changes can be made therein without departing from the spirit and scope of the invention.

The invention claimed is:

1. One or more device-readable storage media encoded with device-executable instructions including steps comprising:
   receiving, at an identity provider, a request for information from a resource provider to authenticate an account;
   retrieving a security claim associated with the account, the security claim being provided by an account store in a first format that is unique to the account store, wherein the account store is one of a plurality of account stores associated with the identity provider, wherein each of the plurality of account stores is associated with a unique format;
   transforming the security claim from the first format to an intermediate format using a first transformation rule associated with the account store, wherein the security claim in the first format and the security claim in the intermediate format contain semantically the same information;
   transforming the security claim from the intermediate format to a second format using a second transformation rule associated with the resource provider, the second format recognized by the resource provider;
   providing the security claim in the second format to the resource provider.

2. The one or more device-readable storage media as recited in claim 1 the steps further comprising identifying the first transformation rule associated with the account store from a set of rules maintained by the identity provider, each rule in the set associated with a corresponding account store.

3. The one or more device-readable storage media as recited in claim 2, the steps further comprising:
identifying a new account store associated with the identity provider;
determining a new format associated with the new account store;
determining a new rule to transform the new format to the intermediate format;
incorporating the new rule into the set of rules maintained by the identity provider; and
associating the new rule with the new account store for processing security claims provided by the new account store.

4. The one or more device-readable storage media as recited in claim 1, the steps further comprising:
identifying the second transformation rule associated with the resource provider from a set of rules maintained by the identity provider, each rule in the set associated with a corresponding resource provider.

5. The one or more device-readable storage media as recited in claim 4, the steps further comprising:
identifying a new resource provider associated with the identity provider;
determining a new format associated with the new resource provider;
determining a new rule to transform the new format to the intermediate format;
incorporating the new rule into the set of rules maintained by the identity provider; and
associating the new rule with the new resource provider for processing security claims provided to the new resource provider.

6. The one or more device-readable storage media as recited in claim 1, the steps further comprising:
receiving the security claim in the second format by the resource provider;
transforming the security claim to another intermediate format associated with the resource provider;
identifying the application to which the-security claim is destined;
transforming the security claim from the other intermediate format to a third format using a third transformation rule associated with the identified application, the third format recognized by the application;
providing the security claim in the third format to the application.

7. The one or more device-readable storage media as recited in claim 6, the steps further comprising identifying the third transformation rule from a set of rules maintained by the resource provider, each rule in the set associated with a corresponding application.

8. The one or more device-readable storage media as recited in claim 7, the steps further comprising:
identifying a new application associated with the resource provider;
determining a third format associated with claims requested by the resource provider;
determining a new rule to transform claims in the intermediate format to the third format;
incorporating the new rule to the set of rules maintained by the resource provider; and
associating the new rule with the new application for processing security claims destined for the new application.

9. A computing device configured to read the one or more device-readable storage media and to perform the steps as recited in claim 1.

10. One or more device-readable storage media encoded with device-executable components comprising:
account stores configured to maintain data associated with accounts, each account store further configured to provide a security claim in a format specific to the account store, wherein the account stores include at least one of: Active Directory (AD), Active Directory Application Mode (ADAM), or Structured Query Language (SQL) systems; and
an identity provider security token service (STS-IP) configured to retrieve the security claims provided by the account stores, the STS-IP also configured to transform each security claim from the format specific to the account store providing the security claim to an intermediate format, wherein each security claim in the format specific to the account store providing the security claim and in the intermediate format contain semantically the same information, the STS-IP further configured to transform the security claim from the intermediate format to a federated format specific to a resource provider to which the security claim is to be sent.

11. The one or more device-readable storage media as recited in claim 10, further comprising a resource provider security token service (STS-RP) configured to receive security claims from the STS-IP, the STS-RP also configured to transform each security claim from the federated format to another intermediate format, the STS-RP further configured to transform each security claim from the another intermediate format to a format specific to an application to which the security claim is destined.

12. The one or more device-readable storage media as recited in claim 11, wherein at least one of the STS-IP, the STS-RP, or the account stores are implemented in a Federation Service (FS).

13. The one or more device-readable storage media as recited in claim 11, wherein at least one of the STS-IP or the STS-RP is configured to perform security claim transformation with string comparisons.

14. A federated authentication system having one or more computing devices, the federated authentication system comprising:
means for receiving information for authenticating a user seeking access to services provided by a resource provider;
means for receiving a security claim associated with the user from an account store in an identity provider system, wherein the security claim is in an account store specific format associated with the account store, wherein the account store is one of a plurality of account stores associated with the identity provider system, wherein each of the plurality of account stores is associated with a distinct account store specific format;
means for transforming the security claim from the account store specific format to an intermediate format, wherein the security claim in the account store specific format and the security claim in the intermediate format contain semantically the same information;
means for transforming the security claim from the intermediate format to a federated format recognized by the resource provider; and
means for providing the security claim in the federated format to the resource provider using a security token.

15. The federated authentication system as recited in claim 14, wherein the identity provider system include multiple account stores and multiple resource providers, wherein the multiple account stores comprise at least the plurality of account stores, and wherein a first set of rules associated with the multiple account stores are used to transform individual security claims from individual account store specific formats to the intermediate format, and wherein a second set of rules associated with the multiple resource providers are used to transform security claims from the intermediate format to federated formats corresponding to the resource providers.

16. The federated authentication system as recited in claim 15, further comprising:

means for implementing only M number of rules in the first set, wherein M is equal to a number of the account stores in the identity provider system; and means for implementing only N number of rules in the second set, wherein N is equal to a number of resource providers.

17. The federated authentication system as recited in claim 16, further comprising means for providing security claim transformation for a new account store in the identity provider system by adding only one rule in the first set.

18. The federated authentication system as recited in claim 16, further comprising means for providing security claim transformation for a new resource provider by adding only one rule in the second set.

\* \* \* \* \*